United States Patent
Uan-Zo-Li et al.

(10) Patent No.: US 11,429,172 B2
(45) Date of Patent: Aug. 30, 2022

(54) DIGITAL LINEAR REGULATOR CLAMPING METHOD AND APPARATUS

(71) Applicant: Intel Corporation, Santa Clara, CA (US)

(72) Inventors: Alexander Uan-Zo-Li, Hillsboro, OR (US); Eugene Gorbatov, Hillsboro, OR (US); Harish Krishnamurthy, Beaverton, OR (US); Alexander Lyakhov, Portland, OR (US); Patrick Leung, Portland, OR (US); Stephen Gunther, Beaverton, OR (US); Arik Gihon, Rishon le Zion (IL); Khondker Ahmed, Hillsboro, OR (US); Philip Lehwalder, Hillsboro, OR (US); Sameer Shekhar, Portland, OR (US); Vishram Pandit, Bangalore (IN); Nimrod Angel, Haifa (IL); Michael Zelikson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/735,563

(22) Filed: Jan. 6, 2020

(65) Prior Publication Data

US 2021/0208656 A1 Jul. 8, 2021

(51) Int. Cl.
*G06F 1/32* (2019.01)
*G05F 1/56* (2006.01)

(52) U.S. Cl.
CPC . *G06F 1/32* (2013.01); *G05F 1/56* (2013.01)

(58) Field of Classification Search
CPC ............ G06F 1/26; G06F 1/263; G06F 1/266
See application file for complete search history.

(56) References Cited

U.S. PATENT DOCUMENTS

| | | | | |
|---|---|---|---|---|
| 2008/0111534 A1* | 5/2008 | Ravichandran | ........... | H02J 1/10 323/351 |
| 2013/0134959 A1* | 5/2013 | Murakami | .......... | H02M 3/1584 323/311 |
| 2013/0275782 A1* | 10/2013 | Svilan | ................... | G06F 1/3203 713/300 |
| 2014/0223205 A1* | 8/2014 | Muthukaruppan | ..... | G06F 1/324 713/320 |

(Continued)

*Primary Examiner* — Jaweed A Abbaszadeh
*Assistant Examiner* — Cheri L Harrington
(74) *Attorney, Agent, or Firm* — Schwabe, Williamson & Wyatt, P.C.

(57) ABSTRACT

A power supply architecture combines the benefits of a traditional single stage power delivery, when there are no additional power losses in the integrated VR with low VID and low CPU losses of FIVR (fully integrated voltage regulator) and D-LVR (digital linear voltage regulator). The D-LVR is not in series with the main power flow, but in parallel. By placing the digital-LVR in parallel to a primary VR (e.g., motherboard VR), the CPU VID is lowered and the processor core power consumption is lowered. The power supply architecture reduces the guard band for input power supply level, thereby reducing the overall power consumption because the motherboard VR specifications can be relaxed, saving cost and power. The power supply architecture drastically increases the CPU performance at a small extra cost for the silicon and low complexity of tuning.

16 Claims, 8 Drawing Sheets

(56) References Cited

U.S. PATENT DOCUMENTS

| | | | |
|---|---|---|---|
| 2014/0359311 A1* | 12/2014 | Jahagirdar | G06F 9/5094 |
| | | | 713/300 |
| 2015/0357815 A1* | 12/2015 | Luh | H02J 7/0063 |
| | | | 307/31 |
| 2016/0181803 A1* | 6/2016 | Krishnamurthy | G06F 1/263 |
| | | | 307/31 |
| 2016/0342185 A1* | 11/2016 | Rodriguez | G06F 1/26 |
| 2017/0031411 A1* | 2/2017 | Muthukaruppan | G06F 1/3243 |
| 2017/0083067 A1* | 3/2017 | Ganor | G06F 1/18 |
| 2017/0308153 A1* | 10/2017 | Chou | G06F 1/3287 |
| 2018/0284823 A1* | 10/2018 | Na | G05F 1/575 |

* cited by examiner

DIGITAL LINEAR REGULATOR CLAMPING METHOD AND APPARATUS

BACKGROUND

With each new process technology node, it is getting more difficult to improve the performance of a system-on-chip (SOC) in terms of power delivery, power consumption, etc. This results in the growth of the SOC peak power, which masks the lack of significant improvement in the silicon performance at a given power. In addition, leakage power is becoming a higher percentage of the total SOC power consumption. Further, virus applications are spreading, which result in potential worsening of power consumption scenarios. To calculate the peak SOC current, these virus applications must be taken into account.

As the maximum current supply, Iccmax, for the SOC, central processing unit (CPU), or graphics processor unit (GPU), is increasing, determining or calculating the input voltage for a voltage regulator becomes important because the input voltage may droop due to sudden loading requirements by the SOC, CPU, or GPU. To account for such sudden droops, a higher than necessary voltage level for the input supply voltage is selected to cover a wide loading spectrum. This higher than necessary voltage level results in higher package power dissipation and lower performance because most of the time such high input supply voltage is not needed. This higher than necessary voltage level is based on several factors such as motherboard (MB) load-line (LL) and maximum processor current requirement; inaccuracy of MB voltage regulator (VR) output voltage (e.g., due to ripple, DC offset, load line inaccuracy, etc.); and additional guard band in manufacturing. These factors increase the input voltage supply to the processor cores, SOC, CPU, or GPU, even when the realistic peak current to such loads is much lower than the Imax.

The realistic peak current to various loads is much lower than the Imax (of Iccmax) from viruses because the application dynamic capacitance (Cdyn) is much lower than the worst case Cdyn. The voltage identification code (VID) is based on the worst case MB VR performance, which is generally not exhibited. The extra guard bands in manufacturing are based on aggressive estimates of power draw from virus applications.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
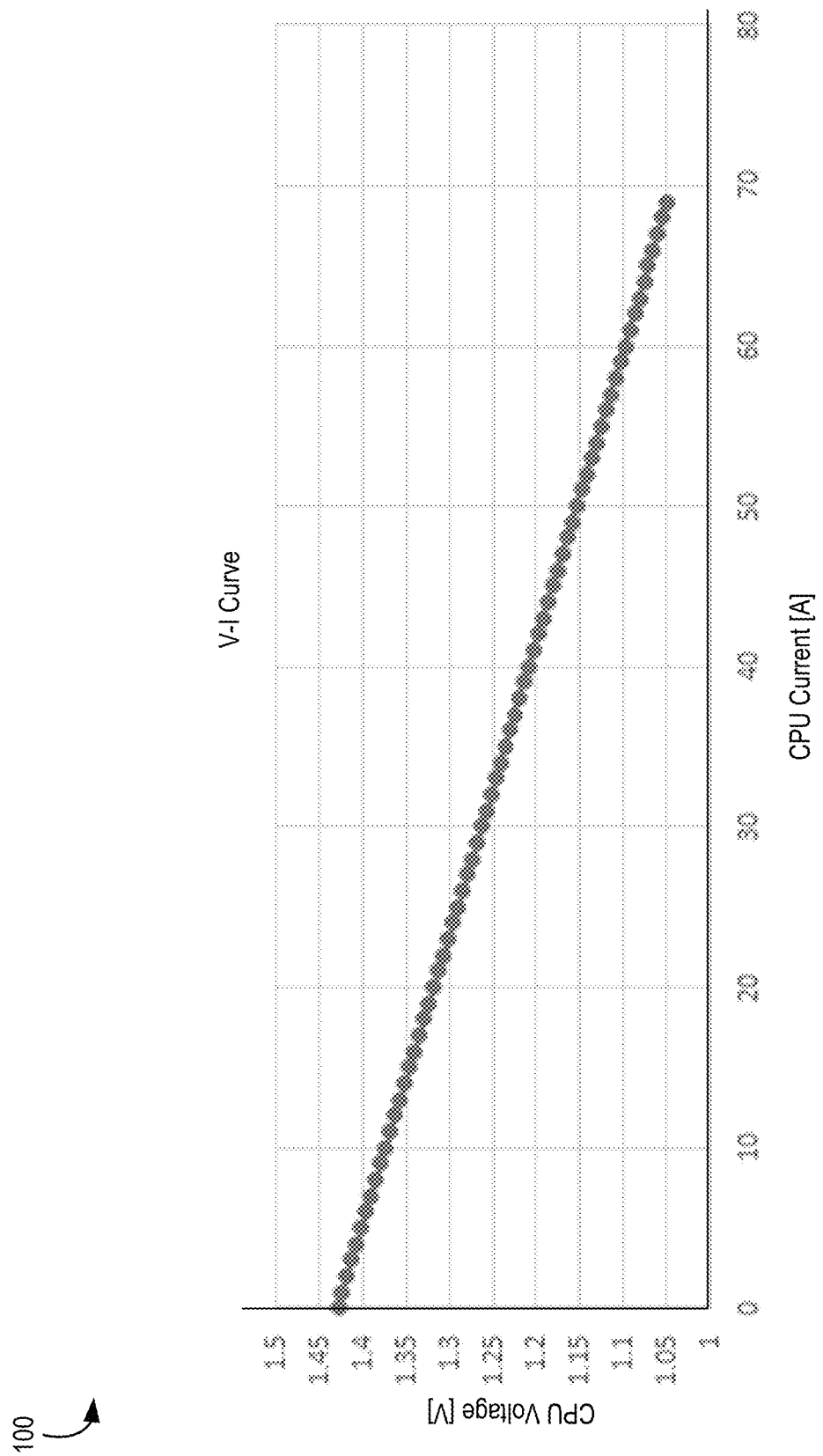
FIG. 1 illustrates a plot showing processor core voltage as a function of processor core current.

Various embodiments describe a power supply architecture that combines the benefits of a traditional single stage power delivery, when there are no additional power losses in the integrated VR, with low VID and low CPU losses of FIVR (fully integrated voltage regulator) and D-LVR (digital linear voltage regulator). In various embodiments, a D-LVR is not in series with the main power flow, but in parallel. For example, D-LVR power gates are coupled in parallel to a MB VR to provide input power supply to a load (e.g., processor core). In some embodiments, a fast linear regulator is positioned in the die, which is in parallel with the a motherboard VR with an active load-line.

There are many technical effects of various embodiments. For example, by placing a digital-LVR in parallel to a primary VR (e.g., motherboard VR), the CPU VID is lowered and the processor core power consumption is lowered. As such, the effective voltage at which the CPU operates is lowered. The power supply architecture reduces the multiple guard bands for the input power supply level, thereby reducing the overall power consumption. The power supply architecture drastically increases the CPU performance at a small extra cost for the silicon, low complexity of tuning, and a relatively small additional motherboard VR. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

Here, the term "analog signal" is any continuous signal for which the time varying feature (variable) of the signal is a representation of some other time varying quantity, i.e., analogous to another time varying signal.

Here, the term "digital signal" is a physical signal that is a representation of a sequence of discrete values (a quantified discrete-time signal), for example of an arbitrary bit stream, or of a digitized (sampled and analog-to-digital converted) analog signal.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, Rectangular Ribbon Transistors, ferroelectric FET (FeFETs), or other devices implementing transistor functionality like carbon nanotubes or spintronic devices. MOSFET symmetrical source and drain terminals i.e., identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates plot 100 showing processor core voltage as a function of processor core current. Here, x-axis is processor core current (or CPU of graphics processing unit (GPU) current) in Amperes [A] while the y-axis is processor core voltage (or CPU or GPU voltage) in Volts (V). The CPU or GPU current in plot 100 is a function of the CPU or GPU application ratio. For example, at a given frequency, the CPU of GPU consumes a current, which is approximately proportional to an application ratio. Here, the term "application ratio" generally indicates a ratio between power consumption of a CPU during the execution of a given instruction versus the power consumed during the execution of the most power demanding virus application. Plot 100 shows that due to Active Voltage Positioning (AVP), the input supply voltage seen by the CPU decreases with the increase in the current consumed by the CPU. When the CPU consumes no current, for example, the CPU voltage is equal to the VID (voltage identification) set in the CPU power supply unit. When the CPU operates at a higher load (e.g., 60 A) of current, its supply voltage drops (e.g., to 1.1V).

Figure 2:
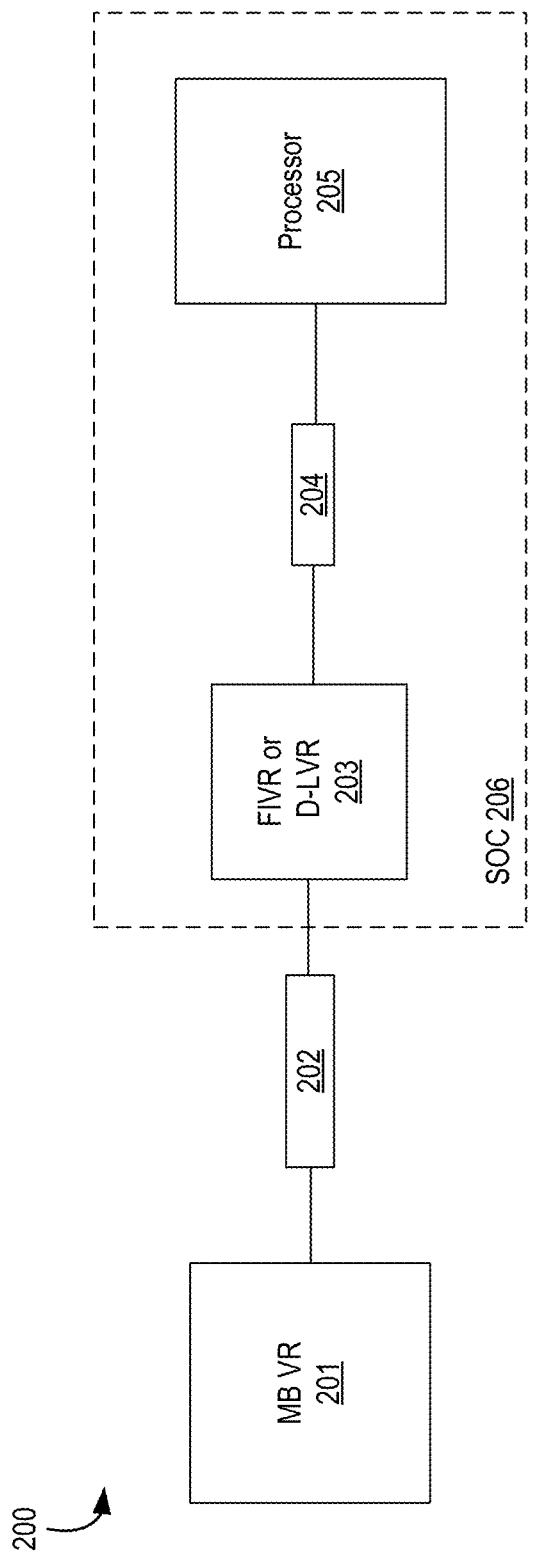
FIG. 2 illustrates a power supply architecture with motherboard voltage regulator (VR) coupled in series with a processor integrated VR.

FIG. 2 illustrates power supply architecture 200 with motherboard voltage regulator (VR) coupled in series with a processor and an integrated VR. Architecture 200 consists of a single motherboard (MB) VR 201, output impedance 202, fully integrated VR (FIVR) or digital linear VR (D-LVR) 203, load-line 204, and processor 205 (or any load). The output impedance 202 is potentially active output impedance, for example, maintained by the MB VR 201. Here, FIVR or D-LVR 203 are shown as part of SOC 206. FIVR 203 generally provides almost zero output load-line. While FIVR 203 is effective at lowering load-line 204, it suffers from challenges.

For example, FIVR 203 consumes power (it's an additional stage of power conversion in series with all the power consumed by the CPU), which may in some cases more than compensate for the advantages due to lower load-line 204. FIVR 203 also takes a lot of die space, and increases the package size. Another challenge for FIVR 203 is that its input voltage is still limited between maximum and minimum values, and the MB load-line (including the package impedance), may limit the CPU performance through the limitation on the Iccmax. Moreover, FIVR adds loses to the silicon, which heats the VPU and limits it performance, as well as increases the total system power.

Placing a D-LVR in series with MB VR 201 (instead of in series with the FIVR) also adds to power loses because of the series connection. To support the operation of D-LVR 203 for worst possible virus, the input voltage to D-LVR 203 must be maintained at the highest level for the worst case application ratio scenario.

In some embodiments, sensors or monitors are added to the power supply architecture that monitor the CPU voltage and throttle the CPU if the CPU voltage of the input voltage to D-LVR 203 is lower than a specific threshold. Here, the term "throttle" generally refers to lowering the CPU load by, for example, lowering operating frequency of the CPU or inserting low power instructions in the instruction pipeline. In this case, the MB VID can be set lower, and the CPU power consumption can be minimized. One challenge of a power delivery architecture with sensors is that if VID is set too high, there is not enough power benefit because the CPU will be consuming a lot of power due to high input supply. If, on the other hand, the VID is set too low, then the CPU will be throttled all the time, and the CPU performance will suffer. Further, setting the VID within the constraint of inherently noisy CPU input voltage, make such an architecture a challenge.

Figure 3:
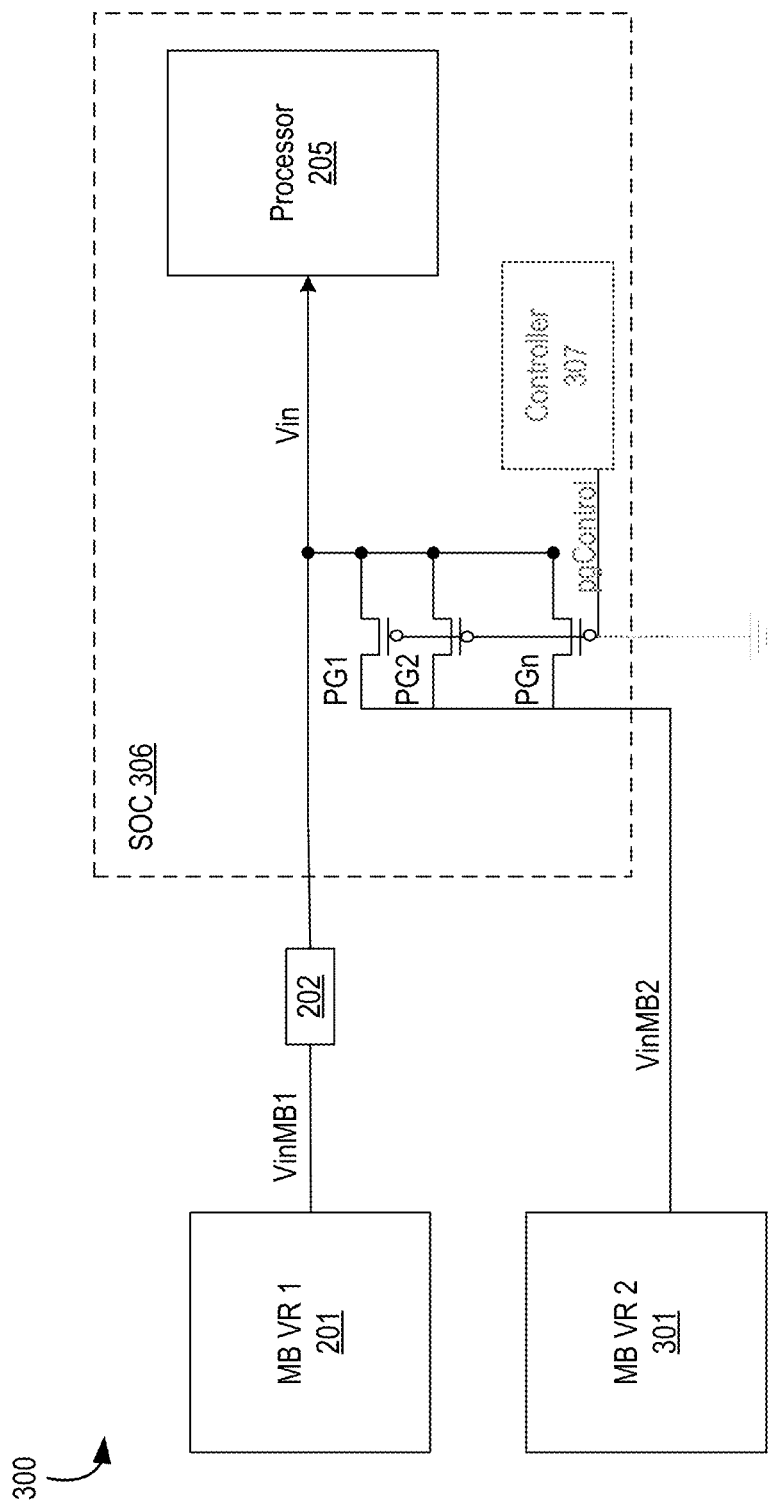
FIG. 3 illustrates a power supply architecture with dual motherboard VRs, in accordance with some embodiments.

FIG. 3 illustrates power supply architecture 300 with dual motherboard VRs, in accordance with some embodiments. Compared to power supply architecture 200, here the series coupled FIVR or D-LVR 203 is removed and a second MB VR 301 is introduced. MB VR 301 provides a secondary input supply VinMB2, while MB VR 201 supplies the primary input voltage supply VinMB1. In various embodiments, a plurality of power gates (PG) 1 through 'n' are coupled in parallel and are also coupled to the SOC input supply rail Vin. These power gates can be inside SOC 206 or off-die. Here, names for signals or supplies are interchangeably used with node or rail names. For example, Vin may refer to signal or power supply Vin, or power node or power supply rail Vin depending on the context of the sentence. In various embodiments, a controller 307 is provided which enables or disables power gates PG1 through PGn using pgControl code (a multi-bit signal). Controller 307 may be part of MB VR 2 301, part of SOC 306, or part of a power management integrated circuit (PMIC). Controller 307 may be used to turn on the power gates before Vin reaches a threshold voltage of the power gate transistors of processor 204.

Power supply architecture 300 allows incredibly large performance upsides, and can be used in multiple applications, and is relatively easy to implement. In some embodiments, MB VR 2 301 is a D-LVR (linear voltage regulator), and it is designed to maintain the voltage Vin at the input to CPU 205 at a given voltage level Vmin (which may be 10 mV to 15 mV above the actual CPU minimum voltage). MB VR 2 301 can also be a switching regulator where power gates PG1 through PGn are responsible for maintaining the input voltage Vin above the CPU Vmin voltage. Here, the term "Vmin" generally refers to a minimum operating voltage below which data in memory or flip-flops no longer remains stable. Below Vmin, it may no longer be possible for a signal to timely propagate through CPU 205. For example, timely signal propagation through CPU 205 may not longer be guaranteed when the supply level falls below Vmin. At Vmin and above, a processor operates properly.

By controlling the number of power gates (or power field effect transistors) PG1-PGn turned on, Controller 307 can clamp the CPU input voltage Vin at or above the set value, the Vmin voltage. In various embodiments, MB VR 2 301 is a much smaller voltage regulator compared to MB VR 201. For example, MB VR 2 301 may have a switching frequency higher than a switching frequency of MB VR 1 201 to minimize its cost and size. MB VR 2 301 may be designed to only support transient excursions of the CPU power, and thus the components of MB VR 3 301 may be smaller because those components do not need to be designed to withstand the CPU power from thermal perspective.

The efficiency of MB VR 2 301 can be lower compared to the efficiency of MB VR 1 201. Here efficiency of MB VR generally refers to a ration between its output and input power. One reason for having a lower efficiency for MB VR 2 301 is because its operation is expected only in transient, and thus is expected not to add to the system thermal load batter runtime, and the components of MB VR 2 301 may be designed merely to withstand the electrical stress of the CPU power excursion. In some embodiments, the added D-LVR clamps (e.g., power gates PG1-PGn, the ratio between VinMB2 and Vin), are not designed to operate efficiently, because these power gates are used only for short duration and short duty cycle. However, in some embodiments, power gates PG1 through PGn are designed for high efficiency. For example, the voltage ratio between VinMB2 and Vin may be close to 1. In some embodiments, power gates PG1 through PGn are binary weighted. In some embodiments, power gates PG1 through PGn are thermometer weighted. In some embodiments, the resistance of PG1-PGn is modulated based on the PG1-PGn gate-to-source voltage change. The impedance from MB VR 2 301 to the D-LVR power gates PG1 through PGn, and from the D-LVR power gates PG1 through PGn to CPU 205 need not be very low either, since it is expected that the MB voltage VinMB1 is high enough to push through the impedances on its way.

In some embodiments, controller 307 is removed to simplify the design further. For example, the D-LVR power gates PG1 through PGn are turned off naturally—since the power gates are effectively a pass FET, and their output voltage is above the voltage Vin they are trying to control. In this case, the gates terminals of the power gates PG1 through PGn are always tied to ground to keep the power gates ready to clamp Vin should Vin fall below a threshold voltage of the power gates. In various embodiments, power gates are shown as only p-type devices. In some embodiments, a combination of p-type and n-type devices (e.g., like a transmission gate) are used to implement power gates PG1 through PGn. In some embodiments, power gates PG1 through PGn are constructed using multiple gates in series to increase the breakdown voltage of the power gates.

Figure 4:
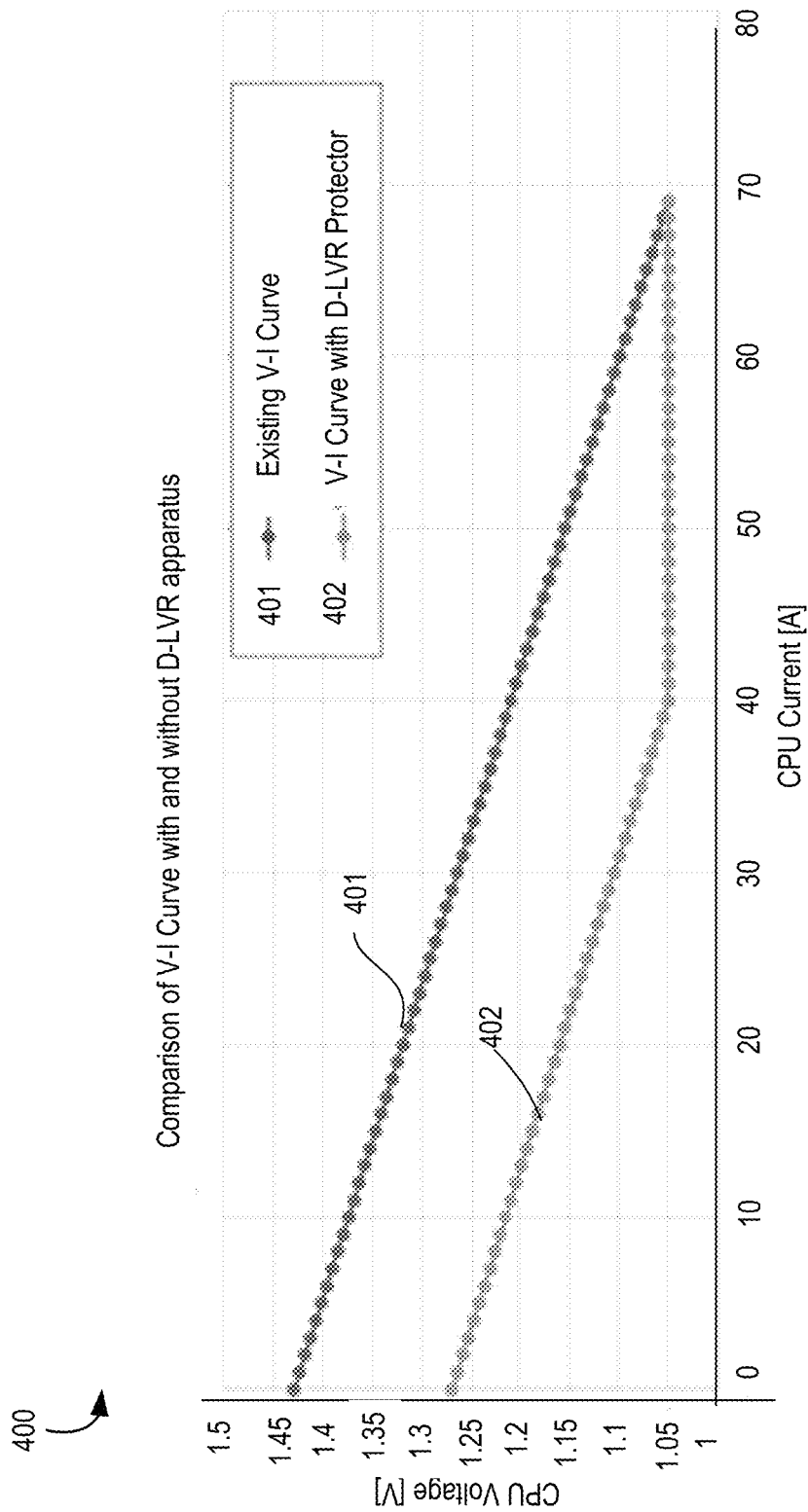
FIG. 4 illustrates a plot comparing processor core voltage as a function of processor core current, for architecture of FIG. 2 vs. architecture of FIG. 3, in accordance with some embodiments.

FIG. 4 illustrates plot 400 comparing processor core voltage as a function of processor core current, for a traditional architecture vs. architecture of FIG. 3, in accordance with some embodiments. In a traditional architecture, MB VR is connected to CPU 205 (or a load) directly. Curve 401 shows the DC Voltage-Current setting of a traditional power delivery architecture for CPU 205. Curve 402 shows the DC Voltage-Current setting of power delivery architecture 300 for a CPU 205.

In this example, based on multiple parameters, it is estimated that CPU 205 is running an application, which rarely requires more than 40 A. In this case, the MB VR 1 201 is set to regulate the voltage at 1.27 V, with a DC load line of 5.5 mOhm. Digital LVR power gates PG1 through PGn are tasked to clamp the voltage Vin of CPU 205 at 1.05 V, which is about 50 mV above the actual minimum CPU voltage. As long as the CPU current is below 40 A, all the power is coming from the MB VR 1 201, the D-LVR power gates PG1 through PGn are turned off naturally—since the power gates are effectively a pass FET, and their output voltage is above the voltage Vin they are trying to control.

Continuing with this example, when the CPU current consumption jumps above 40 A, at least some of the D-LVR power gates PG1 through PGn turn on and provide the additional current to supply rail Vin. In various embodiments, the D-LVR power gates PG1 through PGn provide merely the current in excess of 40 A, while the MB VR 1 201 is providing 40 A. If CPU 205 requires, for example, 45 A, the MB VR 1 201 will provide 40 A and the D-LVR power gates PG1 through PGn will provide the remaining 5 A. As long as the duration and the duty cycle of the excursion above 40 A is short, the D-LVR power gates PG1 through PGn consume little power, and the overwhelming amount of energy is coming from the motherboard VR 1 201, with no intermediate losses. In this case, the power gates may not heat up to a break-down level.

In some embodiments, no special circuitry or any control complexity is needed to support this behavior of power gates PG1 through PGn because D-LVR power gates PG1 through PGn are part of a linear circuit that is integrated in SOC package 306, and it can be very fast. For example, the power gates can switch on/off quickly. Further, D-LVR power gates PG1 through PGn are unidirectional circuit, so if the CPU voltage Vin exceeds the set threshold voltage of the D-LVR power gates PG1 through PGn, the D-LVR turns off. In some embodiments, the bandwidth of MB VR 1 201 is much slower than the bandwidth of MB VR 301 and D-LVR power gates (e.g., a ratio of 300 kHz to 10 MHz). In this case, there is no possible control interaction between the two MB VRs 201 and 301.

In some embodiments, MB VR 1 201 is designed to operate as a circuit with an active load line, maintained by a control system. MB VR 1 201 effectively regulates its output VinMB1 voltage to provide as much current as possible up to, for example 40 A, by its very design, if the VID and the load-line are set accurately. If the VID and the load-line are incorrect (e.g., when the error is too large), then the CPU 205 will either see too much operation of the D-LVR power gates PG1 through PGn or too little, and can correct the VID accordingly. The VID can be controlled based on the fact that the D-LVR ON duty cycle is above a specific limit or the D-LVR is used less often than expected, and thus the VID could be lowered. This mechanism can be used to correct for the inherent inaccuracy of a MB VR controller (e.g., VID setting error due to bandgap or the error in the current measurement affecting the active load-line).

In some embodiments, the VID of the MB VR 1 201 is adjusted dynamically based on the amount of "work" that the D-LVR (MB VR 2 301) is doing. If the D-LVR (MB VR 2 301) is doing relatively little work (for example, because the VID of MB VR 1 201 is due to error and higher than requested, or if CPU 205 is doing relatively little work—i.e. low "app ratio") then the VID can be lowered. VID can be raised in the opposite case. A PID (proportional-integral-derivative) control can be designed and fine-tuned based on benchmark measurement to provide optimal performance to vary the VID.

Figures 5A, 5B:
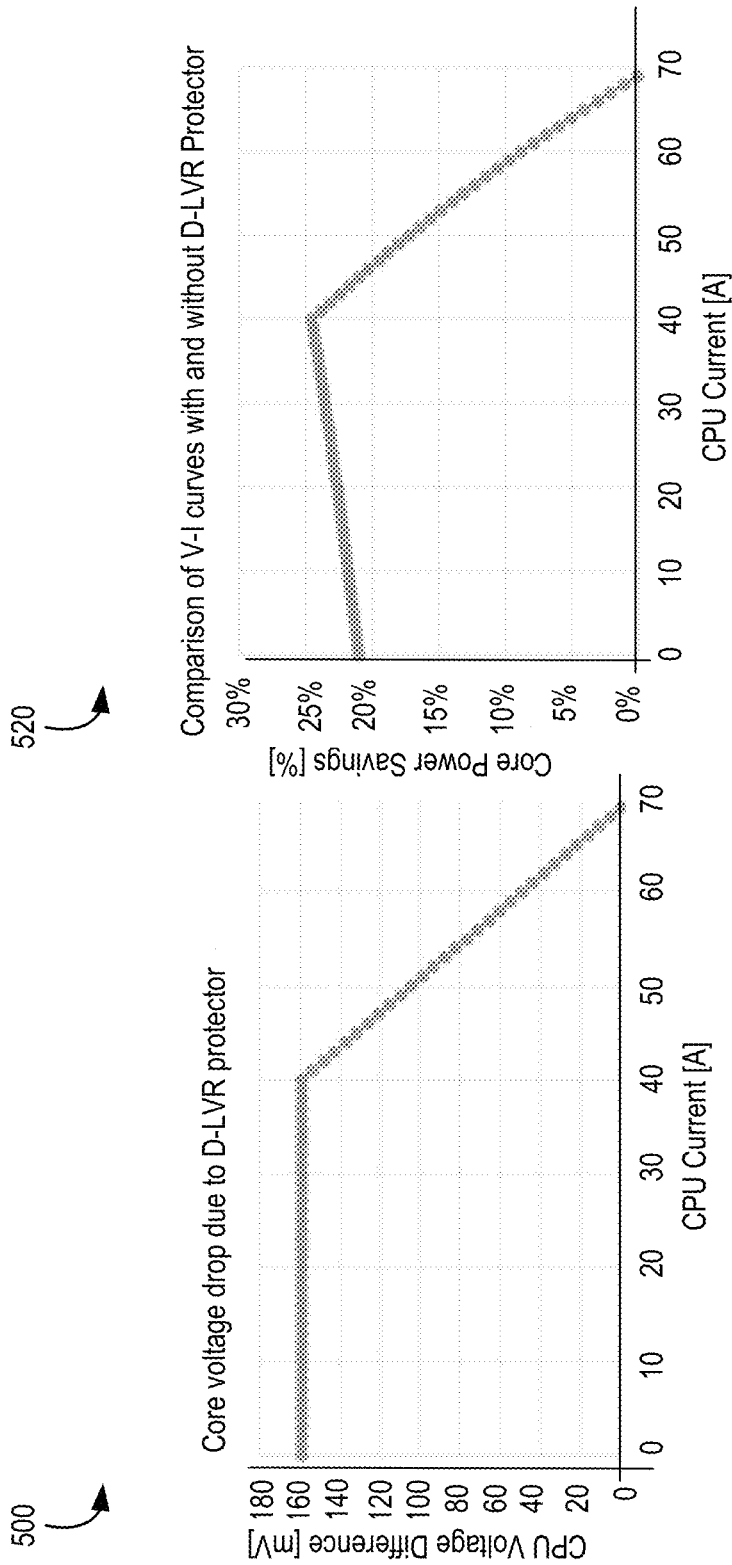
FIGS. 5A-B illustrate plots, respectively, showing voltage and power benefit of a digital linear voltage regulator as a voltage clamp.

FIGS. 5A-B illustrate plots 500 and 520, respectively, showing voltage and power benefit of a digital linear voltage regulator as a voltage clamp. Plot 500 shows an estimated CPU voltage decrease compared to power architecture 200. Plot 500 shows that it is possible to eliminate as much as, for example, 160 mV of the CPU voltage Vin, which translates to about 20% to 25% decrease of the CPU power as shown in plot 520. Here, the portion showing the power saving beyond 40 A does not take into account the D-LVR losses. In this example, a 21% drop in the CPU is translated to approximately 7% performance gain.

Power architecture 300 can be further improved with some tuning of the VID level based on the duration of the D-LVR power gate operation and the total system consumption. In some cases, the VID level is decreased if D-LVR is under-used, and in some cases, it could be increased, if the D-LVR power gates are used too much. Specific optimizations and definitions of over and under use are defined based on designs and thermal capacity and may vary. In some embodiments, a control scheme is used to minimize the total package power consumption. For example, if the effective dynamic capacitance (Cdyn) of CPU 205 is higher in some applications, and there is a significant number of times when D-LVR power gates turned on, then CPU 205 can increase the MB VID of MB VR 201 and allow CPU 205 to dissipate more heat for a certain amount of time. In some cases, CPU 205 may also lower the CPU frequency. In both cases, CPU 205 has the options to further optimize performance. Implementation and optimizations may depend on the specific characteristics of the systems and are expected to be dynamically fine-tuned based on different benchmarks. Here, dynamically generally refers to change a parameters adaptively or in real-time without having the reset the system.

In various embodiments, power architecture 300 allows to merge the power supply rails (e.g., Vin rails) for a general processor and a graphic processor, because the required VID voltage for the highest consumer is decreased. Also, the voltage can be dropped even further at the risk of over-using the D-LVR power gates, and yet still support performance margins required.

There are multiple possible implementations of power architecture 300 and multiple usages of it.

Figure 6:
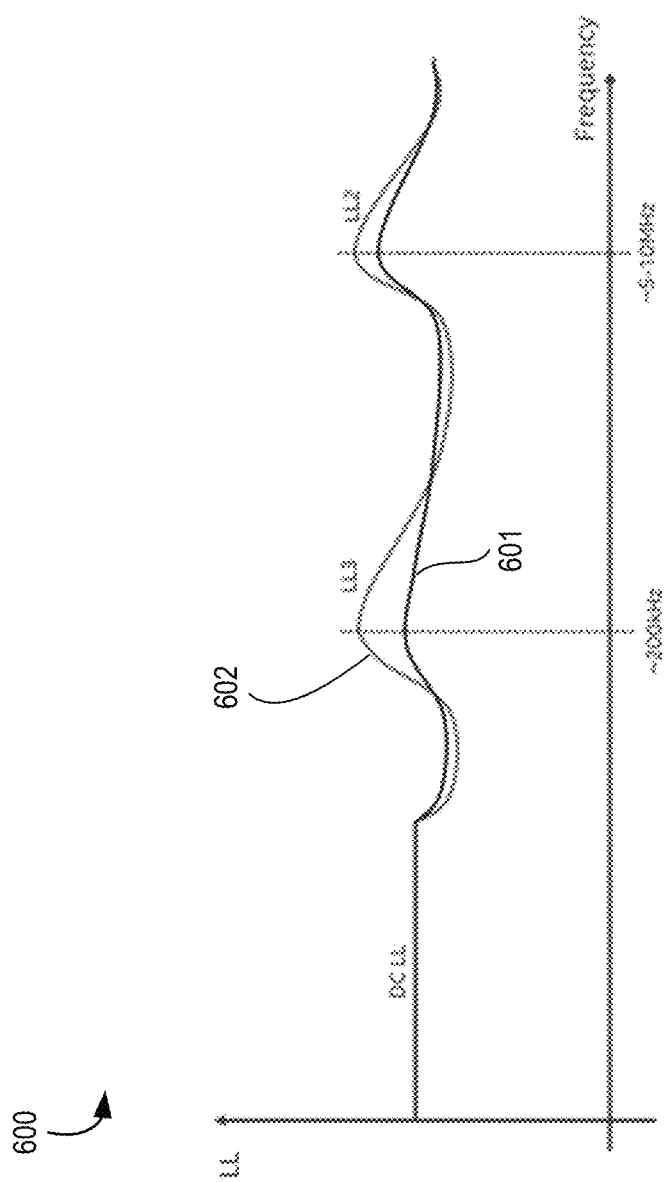
FIG. 6 illustrates a plot showing processor input impedance as a function of frequency.

FIG. 6 illustrates plot 600 showing processor input impedance as a function of frequency. In all applications, the VID is set high enough to avoid the voltage droop due to LL2 or LL3, which would take CPU voltage Vin below the minimum level. Here, LL1 generally refers to on-die load-line impedance, LL2 refers a package load-line impedance, and LL3 generally refers to MB VR 201 impedance in the vicinity of its bandwidth frequency.

By the requirement to set the VID high enough to avoid the voltage droop due to LL2 or LL3, potentially causes either very high package costs, high MB costs, etc. as well as lost performance. For real application, the voltage droops on Vin due to LL2 and LL3 peaks are transitory, and short in duration, because either the MB VR 201 or the package/MB capacitors recover from the droop. For LL3, a typical duration of a droop is less than, for example, 3 µS and for LL2 it is less than, for example, 100 ns. In some embodiments, D-LVR power gates allow for the power delivery system to jump over these spikes naturally and transparently to CPU 205 for short durations, and thus ignores these impedance spikes.

Plot 600 compares an impedance (see curve 601) in a power delivery architecture 200, where LL3 and LL2 are kept below or at the level of the DC LL to prevent lost performance or potential black screens. Curve 602 shows the impedance that a design can use if it utilizes power delivery architecture 300. This application can be useful, for example, for servers, where lowering the package impedance is a major expenditure.

Figure 7:
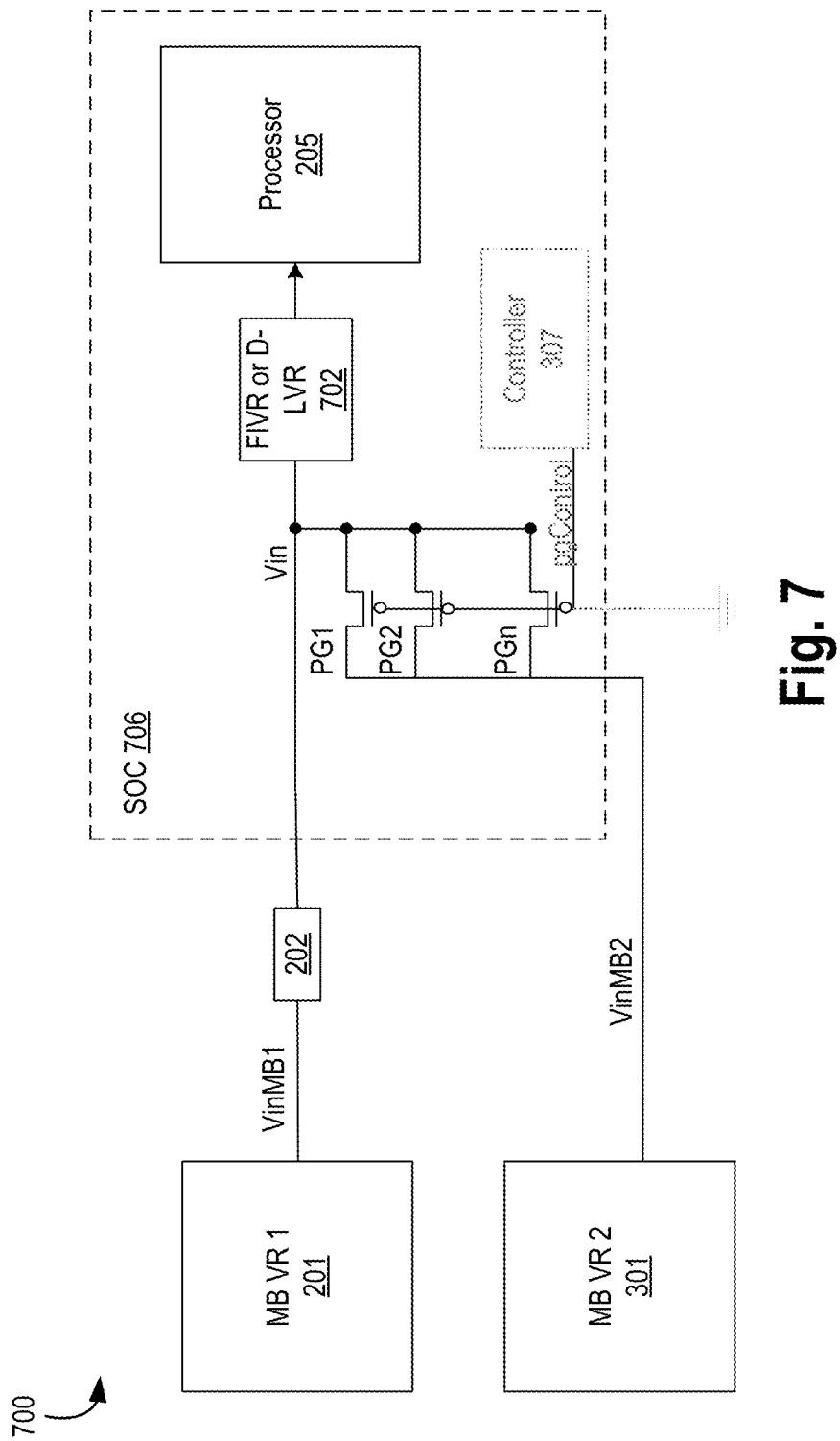
FIG. 7 illustrates a power supply architecture with a digital linear VR clamp in series to an integrated VR of a processor, in accordance with some embodiments.

FIG. 7 illustrates power supply architecture 700 with a digital linear VR clamp at the input to an integrated VR of a processor, in accordance with some embodiments. In today's designs, there are limitations on maximum/minimum input voltage Vin even when CPU 205 is supplied by power from FIVR or from D-LVR or a traditional LDO (all choices represented by 203 in FIG. 2). In servers, it is known that a major limitation on the CPU frequency is the maximum FIVR input voltage, which is due to higher voltage drop on the MB and the package due to high current and high impedance. It is imperative to keep the MB VID as low as possible to minimize the D-LVR losses in block 203. In some embodiments, D-LVR clamp power gates of SOC 706 can resolve both of these situations by allowing the MB VID to be lower and thus minimize the thermal stress on the main D-LVR 702, and in case of FIVR 702, to lower the difference between Vmax and Vmin, and potentially drop the number of phases in the main MB VR.

In graphics processors, loads also have spikes, but for durations of milliseconds. In those processors, the difference between Imax and consumed current can be low, while the duty cycle of such spike events is low. This means that the positive effects of any system, which lowers the VID and relies on the throttling mechanism to protect against the black screening (e.g., CPU being off-line) will be low. On the other hand, D-LVR clamp power gates shown of FIG. 3 operate flawlessly, with the assumption that the time duration when the current goes above the MB VR 201 designed current is short (e.g., few tens of milliseconds) and with small duty cycle (e.g., less than 10% duty cycle).

In today's designs, MB VRs are relatively slow VRs, with potentially high output decoupling capacitance, and it takes long time (e.g., tens of microseconds) to charge the decoupling capacitor. Current MB VRs also result in high current spikes, which in many customer systems cause acoustic noise. CPU (and graphics processors) cannot operate at a higher frequency unless its input voltage Vin is raised to the level determined by a power controller unit to provide such high frequency. A too fast of a change in the VR output voltage in some cases result in the inductors or MB decoupling capacitances "singing." To mitigate the noise, latency of voltage transistors is drastically increased. In reality, the voltage level of Vin is raised to prevent rare, but possible cases of high application ratios, when the CPU may consume high currents, but are unlikely to actually consume it. This is a guard band for rare, but very probable cases. The D-LVR clamp power gates may allow the CPU frequency to be raised even before the MB VR voltage is increased to the required level, and in case of a CPU power jumping to high levels, the CPU will be protected by the D-LVR clamp against the under-voltage conditions.

Figure 8:
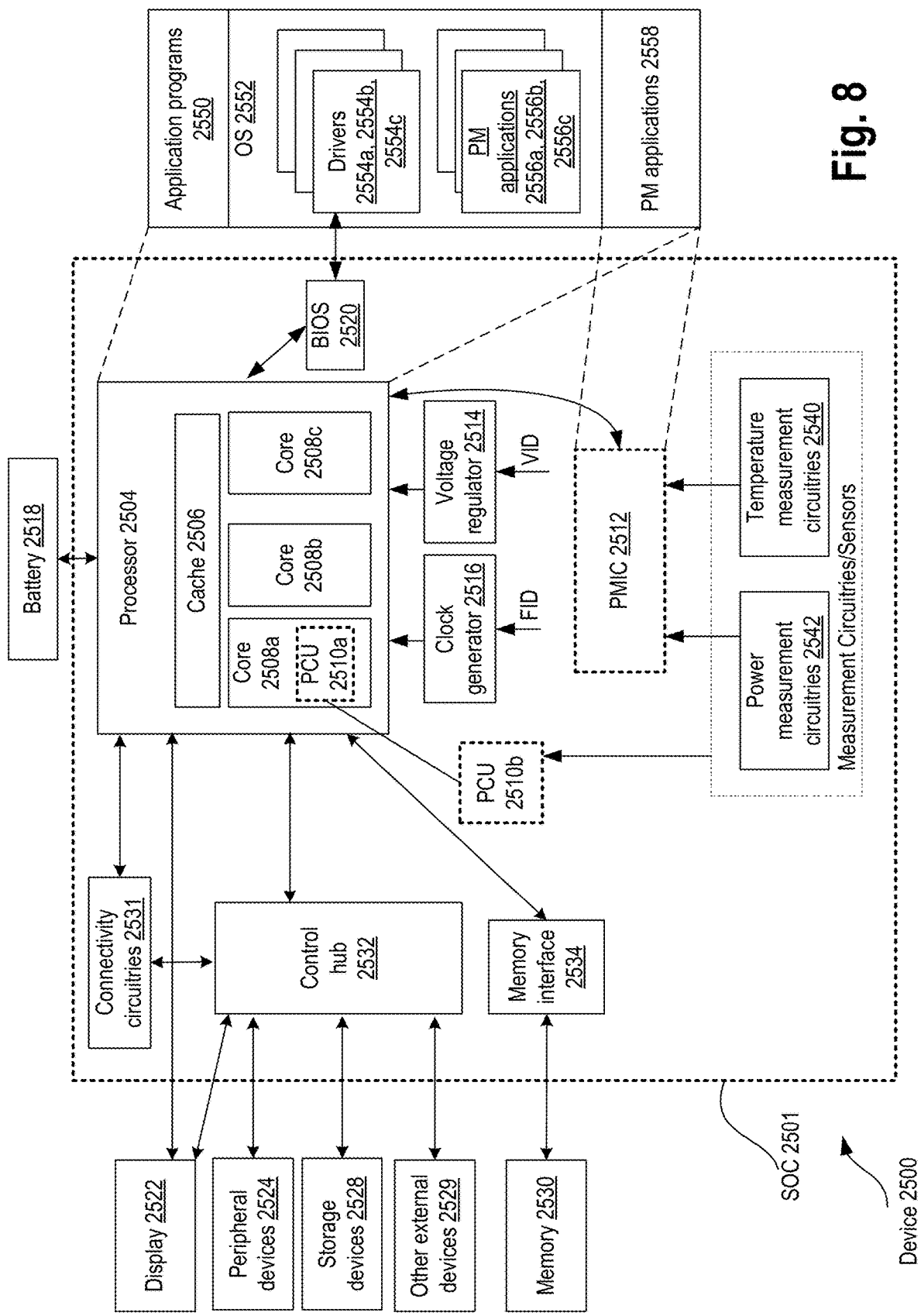
FIG. 8 illustrates a smart device, or a computer system, or a SoC (System-on-Chip) with a power supply architecture that uses a linear voltage regulator as a voltage and current clamp for motherboard VRs with an active load line, according to some embodiments of the disclosure.

FIG. 8 illustrates a smart device, or a computer system, or a SoC (System-on-Chip) with a power supply architecture that uses a linear voltage regulator as a voltage and current clamp for motherboard VRs with an active load line, according to some embodiments of the disclosure.

In some embodiments, device 2500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2500. Any components here that provide power to one or more logic devices can have a power supply architecture that uses a linear voltage regulator as a voltage and current clamp for motherboard VRs with an active load line.

In an example, the device 2500 comprises a SoC (System-on-Chip) 2501. An example boundary of the SOC 2501 is illustrated using dotted lines in FIG. 8, with some example components being illustrated to be included within SOC 2501—however, SOC 2501 may include any appropriate components of device 2500.

In some embodiments, device 2500 includes processor 2504. Processor 2504 can include one or more physical devices, such as microprocessors, application processors, microcontrollers, programmable logic devices, processing cores, or other processing means. The processing operations performed by processor 2504 include the execution of an operating platform or operating system on which applications and/or device functions are executed. The processing operations include operations related to I/O (input/output) with a human user or with other devices, operations related to power management, operations related to connecting computing device 2500 to another device, and/or the like. The processing operations may also include operations related to audio I/O and/or display I/O.

In some embodiments, processor 2504 includes multiple processing cores (also referred to as cores) 2508a, 2508b, 2508c. Although merely three cores 2508a, 2508b, 2508c are illustrated, processor 2504 may include any other appropriate number of processing cores, e.g., tens, or even hundreds of processing cores. Processor cores 2508a, 2508b, 2508c may be implemented on a single integrated circuit (IC) chip. Moreover, the chip may include one or more shared and/or private caches, buses or interconnections, graphics and/or memory controllers, or other components.

In some embodiments, processor 2504 includes cache 2506. In an example, sections of cache 2506 may be dedicated to individual cores 2508 (e.g., a first section of cache 2506 dedicated to core 2508a, a second section of cache 2506 dedicated to core 2508b, and so on). In an example, one or more sections of cache 2506 may be shared among two or more of cores 2508. Cache 2506 may be split in different levels, e.g., level 1 (L1) cache, level 2 (L2) cache, level 3 (L3) cache, etc.

In some embodiments, processor core 2504 may include a fetch unit to fetch instructions (including instructions with conditional branches) for execution by the core 2504. The instructions may be fetched from any storage devices such as the memory 2530. Processor core 2504 may also include a decode unit to decode the fetched instruction. For example, the decode unit may decode the fetched instruction into a plurality of micro-operations. Processor core 2504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2504 may be an out-of-order processor core in one embodiment. Processor core 2504 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2504 may also include a bus unit to enable communication between components of the processor core 2504 and other components via one or more buses. Processor core 2504 may also include one or more registers to store data accessed by various components of the core 2504 (such as values related to assigned app priorities and/or sub-system states (modes) association.

In some embodiments, device 2500 comprises connectivity circuitries 2531. For example, connectivity circuitries 2531 includes hardware devices (e.g., wireless and/or wired connectors and communication hardware) and/or software components (e.g., drivers, protocol stacks), e.g., to enable device 2500 to communicate with external devices. Device 2500 may be separate from the external devices, such as other computing devices, wireless access points or base stations, etc.

In an example, connectivity circuitries 2531 may include multiple different types of connectivity. To generalize, the connectivity circuitries 2531 may include cellular connectivity circuitries, wireless connectivity circuitries, etc. Cellular connectivity circuitries of connectivity circuitries 2531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2531 may include a network interface, such as a wired or wireless interface, e.g., so that a system embodiment may be incorporated into a wireless device, for example, cell phone or personal digital assistant.

In some embodiments, device 2500 comprises control hub 2532, which represents hardware devices and/or software components related to interaction with one or more I/O devices. For example, processor 2504 may communicate with one or more of display 2522, one or more peripheral devices 2524, storage devices 2528, one or more other external devices 2529, etc., via control hub 2532. Control hub 2532 may be a chipset, a Platform Control Hub (PCH), and/or the like.

For example, control hub 2532 illustrates one or more connection points for additional devices that connect to device 2500, e.g., through which a user might interact with the system. For example, devices (e.g., devices 2529) that can be attached to device 2500 include microphone devices, speaker or stereo systems, audio devices, video systems or other display devices, keyboard or keypad devices, or other I/O devices for use with specific applications such as card readers or other devices.

As mentioned above, control hub 2532 can interact with audio devices, display 2522, etc. For example, input through a microphone or other audio device can provide input or commands for one or more applications or functions of device 2500. Additionally, audio output can be provided instead of, or in addition to display output. In another example, if display 2522 includes a touch screen, display 2522 also acts as an input device, which can be at least partially managed by control hub 2532. There can also be additional buttons or switches on computing device 2500 to provide I/O functions managed by control hub 2532. In one embodiment, control hub 2532 manages devices such as accelerometers, cameras, light sensors or other environmental sensors, or other hardware that can be included in device 2500. The input can be part of direct user interaction, as well as providing environmental input to the system to influence its operations (such as filtering for noise, adjusting displays for brightness detection, applying a flash for a camera, or other features).

In some embodiments, control hub 2532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2522 represents hardware (e.g., display devices) and software (e.g., drivers) components that provide a visual and/or tactile display for a user to interact with device 2500. Display 2522 may include a display interface, a display screen, and/or hardware device used to provide a display to a user. In some embodiments, display 2522 includes a touch screen (or touch pad) device that provides both output and input to a user. In an example, display 2522 may communicate directly with the processor 2504. Display 2522 can be one or more of an internal display device, as in a mobile electronic device or a laptop device or an external display device attached via a display interface (e.g., DisplayPort, etc.). In one embodiment display 2522 can be a head mounted display (HMD) such as a stereoscopic display device for use in virtual reality (VR) applications or augmented reality (AR) applications.

In some embodiments and although not illustrated in the figure, in addition to (or instead of) processor 2504, device 2500 may include Graphics Processing Unit (GPU) comprising one or more graphics processing cores, which may control one or more aspects of displaying contents on display 2522.

Control hub 2532 (or platform controller hub) may include hardware interfaces and connectors, as well as software components (e.g., drivers, protocol stacks) to make peripheral connections, e.g., to peripheral devices 2524.

It will be understood that device 2500 could both be a peripheral device to other computing devices, as well as have peripheral devices connected to it. Device 2500 may have a "docking" connector to connect to other computing devices for purposes such as managing (e.g., downloading and/or uploading, changing, synchronizing) content on device 2500. Additionally, a docking connector can allow device 2500 to connect to certain peripherals that allow computing device 2500 to control content output, for example, to audiovisual or other systems.

In addition to a proprietary docking connector or other proprietary connection hardware, device 2500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2531 may be coupled to control hub 2532, e.g., in addition to, or instead of, being coupled directly to the processor 2504. In some embodiments, display 2522 may be coupled to control hub 2532, e.g., in addition to, or instead of, being coupled directly to processor 2504.

In some embodiments, device 2500 comprises memory 2530 coupled to processor 2504 via memory interface 2534. Memory 2530 includes memory devices for storing information in device 2500. Memory can include nonvolatile (state does not change if power to the memory device is interrupted) and/or volatile (state is indeterminate if power to the memory device is interrupted) memory devices. Memory device 2530 can be a dynamic random access memory (DRAM) device, a static random access memory (SRAM) device, flash memory device, phase-change memory device, or some other memory device having suitable performance to serve as process memory. In one embodiment, memory 2530 can operate as system memory for device 2500, to store data and instructions for use when the one or more processors 2504 executes an application or process. Memory 2530 can store application data, user data, music, photos, documents, or other data, as well as system data (whether long-term or temporary) related to the execution of the applications and functions of device 2500.

Elements of various embodiments and examples are also provided as a machine-readable medium (e.g., memory 2530) for storing the computer-executable instructions (e.g., instructions to implement any other processes discussed herein). The machine-readable medium (e.g., memory 2530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2500 comprises temperature measurement circuitries 2540, e.g., for measuring temperature of various components of device 2500. In an example, temperature measurement circuitries 2540 may be embedded, or coupled or attached to various components, whose temperature are to be measured and monitored. For example, temperature measurement circuitries 2540 may measure temperature of (or within) one or more of cores 2508a, 2508b, 2508c, voltage regulator 2514, memory 2530, a motherboard of SOC 2501, and/or any appropriate component of device 2500.

In some embodiments, device 2500 comprises power measurement circuitries 2542, e.g., for measuring power consumed by one or more components of the device 2500. In an example, in addition to, or instead of, measuring power, the power measurement circuitries 2542 may measure voltage and/or current. In an example, the power measurement circuitries 2542 may be embedded, or coupled or attached to various components, whose power, voltage, and/or current consumption are to be measured and monitored. For example, power measurement circuitries 2542 may measure power, current and/or voltage supplied by one or more voltage regulators 2514, power supplied to SOC 2501, power supplied to device 2500, power consumed by processor 2504 (or any other component) of device 2500, etc.

In some embodiments, device 2500 comprises one or more voltage regulator circuitries, generally referred to as voltage regulator (VR) 2514 VR having a high bandwidth and low power differential-to-single-ended type-III compensator. VR 2514 generates signals at appropriate voltage levels, which may be supplied to operate any appropriate components of the device 2500. Merely as an example, VR 2514 is illustrated to be supplying signals to processor 2504 of device 2500. In some embodiments, VR 2514 receives one or more Voltage Identification (VID) signals, and generates the voltage signal at an appropriate level, based on the VID signals. Various type of VRs may be utilized for the VR 2514. For example, VR 2514 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2510a/b and/or PMIC 2512. In some embodiments, each core has a network of distributed LDOs to provide efficient control for power management. The LDOs can be digital, analog, or a combination of digital or analog LDOs.

In some embodiments, device 2500 comprises one or more clock generator circuitries, generally referred to as clock generator 2516. Clock generator 2516 generates clock signals at appropriate frequency levels, which may be supplied to any appropriate components of device 2500. Merely as an example, clock generator 2516 is illustrated to be supplying clock signals to processor 2504 of device 2500. In some embodiments, clock generator 2516 receives one or more Frequency Identification (FID) signals, and generates the clock signals at an appropriate frequency, based on the FID signals. Clock generator 2516 is an adaptive clock source that can provide an adaptive frequency output as discussed with reference to various embodiments.

In some embodiments, device 2500 comprises battery 2518 supplying power to various components of device 2500. Merely as an example, battery 2518 is illustrated to be supplying power to processor 2504. Although not illustrated in the figures, device 2500 may comprise a charging circuitry, e.g., to recharge the battery, based on Alternating Current (AC) power supply received from an AC adapter.

In some embodiments, device 2500 comprises Power Control Unit (PCU) 2510 (also referred to as Power Management Unit (PMU), Power Controller, etc.). In an example, some sections of PCU 2510 may be implemented by one or more processing cores 2508, and these sections of PCU 2510 are symbolically illustrated using a dotted box and labelled PCU 2510a. In an example, some other sections of PCU 2510 may be implemented outside the processing cores 2508, and these sections of PCU 2510 are symbolically illustrated using a dotted box and labelled as PCU 2510b. PCU 2510 may implement various power management operations for device 2500. PCU 2510 may include hardware interfaces, hardware circuitries, connectors, registers, etc., as well as software components (e.g., drivers, protocol stacks), to implement various power management operations for device 2500.

In some embodiments, device 2500 comprises Power Management Integrated Circuit (PMIC) 2512, e.g., to implement various power management operations for device 2500. In some embodiments, PMIC 2512 is a Reconfigurable Power Management ICs (RPMICs) and/or an IMVP (Intel® Mobile Voltage Positioning). In an example, the PMIC is within an IC chip separate from processor 2504. The may implement various power management operations for device 2500. PMIC 2512 may include hardware interfaces, hardware circuitries, connectors, registers, etc., as well as software components (e.g., drivers, protocol stacks), to implement various power management operations for device 2500.

In an example, device 2500 comprises one or both PCU 2510 or PMIC 2512. In an example, any one of PCU 2510 or PMIC 2512 may be absent in device 2500, and hence, these components are illustrated using dotted lines.

Various power management operations of device 2500 may be performed by PCU 2510, by PMIC 2512, or by a combination of PCU 2510 and PMIC 2512. For example, PCU 2510 and/or PMIC 2512 may select a power state (e.g., P-state) for various components of device 2500. For example, PCU 2510 and/or PMIC 2512 may select a power state (e.g., in accordance with the ACPI (Advanced Configuration and Power Interface) specification) for various components of device 2500. Merely as an example, PCU 2510 and/or PMIC 2512 may cause various components of the device 2500 to transition to a sleep state, to an active state, to an appropriate C state (e.g., C0 state, or another appropriate C state, in accordance with the ACPI specification), etc. In an example, PCU 2510 and/or PMIC 2512 may control a voltage output by VR 2514 (e.g., SCVR) and/or a frequency of a clock signal output by the clock generator, e.g., by outputting the VID signal and/or the FID signal, respectively. In an example, PCU 2510 and/or PMIC 2512 may control battery power usage, charging of battery 2518, and features related to power saving operation.

The clock generator 2516 can comprise a phase locked loop (PLL), frequency locked loop (FLL), or any suitable clock source. In some embodiments, each core of processor 2504 has its own clock source. As such, each core can operate at a frequency independent of the frequency of operation of the other core. In some embodiments, PCU 2510 and/or PMIC 2512 performs adaptive or dynamic frequency scaling or adjustment. For example, clock frequency of a processor core can be increased if the core is not operating at its maximum power consumption threshold or limit. In some embodiments, PCU 2510 and/or PMIC 2512 determines the operating condition of each core of a processor, and opportunistically adjusts frequency and/or power supply voltage of that core without the core clocking source (e.g., PLL of that core) losing lock when the PCU 2510 and/or PMIC 2512 determines that the core is operating below a target performance level. For example, if a core is drawing current from a power supply rail less than a total current allocated for that core or processor 2504, then PCU 2510 and/or PMIC 2512 can temporality increase the power draw for that core or processor 2504 (e.g., by increasing clock frequency and/or power supply voltage level) so that the core or processor 2504 can perform at higher performance level. As such, voltage and/or frequency can be increased temporality for processor 2504 without violating product reliability. In some embodiments, PMIC 2512 includes the power supply architecture that uses a linear voltage regulator as a voltage and current clamp for motherboard VRs with an active load line.

In an example, PCU 2510 and/or PMIC 2512 may perform power management operations, e.g., based at least in part on receiving measurements from power measurement circuitries 2542, temperature measurement circuitries 2540, charge level of battery 2518, and/or any other appropriate information that may be used for power management. To that end, PMIC 2512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2510 and/or PMIC 2512 in at least one embodiment to allow PCU 2510 and/or PMIC 2512 to manage processor core energy at least in part based on value(s) detected by one or more of the sensors.

Also illustrated is an example software stack of device 2500 (although not all elements of the software stack are illustrated). Merely as an example, processors 2504 may execute application programs 2550, Operating System 2552, one or more Power Management (PM) specific application programs (e.g., generically referred to as PM applications 2558), and/or the like. PM applications 2558 may also be executed by the PCU 2510 and/or PMIC 2512. OS 2552 may also include one or more PM applications 2556*a*, 2556*b*, 2556*c*. The OS 2552 may also include various drivers 2554*a*, 2554*b*, 2554*c*, etc., some of which may be specific for power management purposes. In some embodiments, device 2500 may further comprise a Basic Input/Output System (BIOS) 2520. BIOS 2520 may communicate with OS 2552 (e.g., via one or more drivers 2554), communicate with processors 2504, etc.

For example, one or more of PM applications 2558, 2556, drivers 2554, BIOS 2520, etc. may be used to implement power management specific tasks, e.g., to control voltage and/or frequency of various components of device 2500, to control wake-up state, sleep state, and/or any other appropriate power state of various components of device 2500, control battery power usage, charging of the battery 2518, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples are provided to illustrate the various embodiments. These examples can depend from one another in any suitable manner.

Example 1: An apparatus comprising: a first voltage regulator (VR) with a first efficiency; a second VR with a second efficiency, wherein the second efficiency is lower than the first efficiency; a plurality of power gates coupled to an output of the first VR and to an output of the second VR; and a load coupled to the plurality of power gates via an input power supply rail.

Example 2: The apparatus of example 1 comprises an impedance coupled to the output of the first VR and the input power supply rail.

Example 3: The apparatus of example 1, wherein gate terminals of the power gates are coupled to ground.

Example 4: The apparatus of example 1, wherein some of the plurality of power gates automatically turn on when voltage on the input power supply rail falls below a threshold.

Example 5: The apparatus of example 1, wherein the load is a processor core.

Example 6: The apparatus of example 1, wherein the plurality of power gates are located on-die.

Example 7: The apparatus of example 1, wherein source or drain terminals of the plurality of power gates are coupled to the output of the second VR, and wherein drain or source terminals of the plurality of power gates is coupled to the input power supply rail.

Example 8: The apparatus of example 1, wherein the first and second VRs are off-die and located on a motherboard.

Example 9: An apparatus comprising: a first voltage regulator (VR) with a first efficiency; a second VR with a second efficiency, wherein the second efficiency is lower than the first efficiency; a plurality of power gates coupled to an output of the first VR and to an output of the second VR; a third VR coupled to the plurality of power gates and an input power supply rail; and a load coupled to an output of the third VR.

Example 10: The apparatus of example 9 comprises an impedance coupled to the output of the first VR and the input power supply rail.

Example 11: The apparatus of example 9, wherein gate terminals of the power gates are coupled to ground.

Example 12: The apparatus of example 9, wherein the plurality of power gates automatically turn on when voltage on the input power supply rail falls below a threshold.

Example 13: The apparatus of example 9, wherein the load is a processor core.

Example 14: The apparatus of example 9, wherein the plurality of power gates are located on-die.

Example 15: The apparatus of example 9, wherein source or drain terminals of the plurality of power gates are coupled to the output of the second VR, and wherein drain or source terminals of the plurality of power gates is coupled to the input power supply rail.

Example 16: The apparatus of example 9, wherein the first and second VRs are off-die and located on a motherboard.

Example 17: A motherboard comprising: a first voltage regulator (VR) with a first efficiency; a second VR with a second efficiency, wherein the second efficiency is lower than the first efficiency; a system-on-chip (SOC) comprising: a plurality of power gates coupled to an output of the first VR and to an output of the second VR; and a processor core coupled to the plurality of power gates via an input power supply rail; and a antenna coupled to the SOC.

Example 18: The motherboard of example 17 comprises an impedance coupled to the output of the first VR and the input power supply rail.

Example 19: The motherboard of example 17, wherein gate terminals of the power gates are coupled to ground.

Example 20: The motherboard of example 17, wherein some of the plurality of power gates automatically turn on when voltage on the input power supply rail falls below a threshold.

Example 21: The motherboard of example 17, wherein an output voltage, on the output of the first VR, is dynamically increased or decreased based on an activity of a third VR.

Example 22: The motherboard of example 17, wherein a voltage identification (VID) of the first VR is dynamically adjusted based on an activity of a third VR.

Example 23: The motherboard of example 17, wherein the second VR is a faster VR than the first VR, wherein the second VR is positioned in a die, wherein the second VR is in parallel with the first VR with an active load-line.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first voltage regulator (VR) with a first efficiency, an output of the first VR coupled to an input power supply rail via an impedance;
   a second VR with a second efficiency, wherein the second efficiency is lower than the first efficiency;
   a plurality of power gates coupled in parallel between an output of the second VR and the input power supply rail to clamp a supply voltage on the input power supply rail, wherein individual power gates of the plurality of power gates have a source terminal coupled to the output of the second VR, a drain terminal coupled to the input power supply rail, and a gate terminal always coupled to ground, and wherein the power gates are to turn on when the supply voltage on the input power supply rail falls below a respective threshold voltage of the power gates; and
   a load coupled to the input power supply rail.

2. The apparatus of claim 1, wherein the load is a processor core.

3. The apparatus of claim 1, wherein the plurality of power gates are located on a same die as the load.

4. The apparatus of claim 1, wherein the first and second VRs are off-die with respect to the load, and wherein the first and second VRs are located on a motherboard.

5. The apparatus of claim 1, wherein the power gates have different clamping weights.

6. The apparatus of claim 5, wherein the power gates are binary weighted.

7. The apparatus of claim 5, wherein the power gates are thermometer weighted.

8. The apparatus of claim 1, wherein the second VR is a digital linear voltage regulator (D-LVR).

9. An apparatus comprising:
   a first voltage regulator (VR) with a first efficiency, an output of the first VR coupled to an input power supply rail via an impedance;

a second VR with a second efficiency, wherein the second efficiency is lower than the first efficiency;

a plurality of power gates coupled in parallel between an output of the second VR and the input power supply rail to clamp a supply voltage on the input power supply rail, wherein individual power gates of the plurality of power gates have a source terminal coupled to the output of the second VR, a drain terminal coupled to the input power supply rail, and a gate terminal always coupled to ground, and wherein the power gates are to turn on when the supply voltage on the input power supply rail falls below a respective threshold voltage of the power gates; and a third VR having an input coupled to the input power supply rail; and a load coupled to an output of the third VR.

10. The apparatus of claim 9, wherein the load is a processor core.

11. The apparatus of claim 9, wherein the plurality of power gates are located on a same die as the load.

12. The apparatus of claim 9, wherein the first and second VRs are off-die with respect to the load.

13. A system comprising:

a motherboard;

a first voltage regulator (VR) on the motherboard, the first VR with a first efficiency and having an output coupled to an input power supply rail via an impedance;

a second VR on the motherboard, the second VR with a second efficiency, wherein the second efficiency is lower than the first efficiency;

a system-on-chip (SOC) on the motherboard, the SOC comprising:

a plurality of power gates coupled in parallel between an output of the second VR and the input power supply rail to clamp a supply voltage on the input power supply rail, wherein individual power gates of the plurality of power gates have a source terminal coupled to the output of the second VR, a drain terminal coupled to the input power supply rail, and a gate terminal always coupled to ground, and wherein the power gates are to turn on when the supply voltage on the input power supply rail falls below a respective threshold voltage of the power gates; and a processor core coupled to the input power supply rail; and an antenna coupled to the SOC.

14. The system of claim 13, wherein an output voltage, on the output of the first VR, is dynamically increased or decreased based on an activity of a third VR.

15. The system of claim 13, wherein a voltage identification (VID) of the first VR is dynamically adjusted based on an activity of a third VR.

16. The system of claim 13, wherein the second VR is positioned in a die, and wherein the second VR is in parallel with the first VR with an active load-line.

* * * * *